(12) United States Patent
Matsuda et al.

(10) Patent No.: US 9,422,760 B2
(45) Date of Patent: *Aug. 23, 2016

(54) AUTOMOTIVE OPENING SAFETY DEVICE HAVING A SENSOR

(71) Applicant: Nishikawa Rubber Co., Ltd., Hiroshima-shi, Hiroshima-ken (JP)

(72) Inventors: Keigo Matsuda, Hiroshima (JP); Akira Haruta, Hiroshima (JP); Yuzo Hirakawa, Hiroshima (JP); Shingo Tomoyasu, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 104 days.

This patent is subject to a terminal disclaimer.

(21) Appl. No.: 14/448,617

(22) Filed: Jul. 31, 2014

(65) Prior Publication Data

US 2015/0042361 A1 Feb. 12, 2015

(30) Foreign Application Priority Data

Aug. 9, 2013 (JP) ................................ 2013-166747
May 15, 2014 (JP) ................................ 2014-101624

(51) Int. Cl.
| | | |
|---|---|---|
| *G01R 31/26* | (2014.01) | |
| *E05F 15/00* | (2015.01) | |
| *G01V 3/02* | (2006.01) | |
| *H01H 3/16* | (2006.01) | |
| *E05F 15/44* | (2015.01) | |
| *H01H 13/18* | (2006.01) | |

(52) U.S. Cl.
CPC ............ *E05F 15/0008* (2013.01); *B60J 10/24* (2016.02); *B60J 10/273* (2016.02); *B60J 10/32* (2016.02);
(Continued)

(58) Field of Classification Search
CPC ......... E05F 15/42; E05F 15/43; E05F 15/00; E05F 15/431; E05F 15/443; E05F 2015/433; E05F 15/44; E05F 15/47; E05F 15/70; E05F 15/77; E05F 2015/487; E05F 15/0008; E05F 15/0065; E05F 15/06; E05F 15/565; E05F 15/632; E05F 2015/434; G06K 9/00624; G06K 19/0717; G01L 1/16; G01L 1/20; G01L 1/243; G01L 1/26; G01L 17/00; G01L 19/12; G01L 1/005; G01L 1/146; G01L 5/0038; G01L 5/0085; G01L 5/00; G01V 3/02

See application file for complete search history.

(56) References Cited

U.S. PATENT DOCUMENTS 4,640,050 A * 2/1987 Yamagishi ................. B60J 5/06
49/139
6,260,418 B1 7/2001 Ishihara et al.
(Continued)

FOREIGN PATENT DOCUMENTS

| EP | 1 319 788 A2 | 6/2003 |
|---|---|---|
| JP | 3700267 B2 | 7/2005 |
| JP | 3844684 B2 | 8/2006 |

OTHER PUBLICATIONS

Communication (extended European Search Report) dated Feb. 6, 2015, issued by the European Patent Office in related European Patent Application No. 14178366.2-1808. (5 pages).
(Continued)

*Primary Examiner* — Vinh Nguyen
(74) *Attorney, Agent, or Firm* — Robert P. Michal, Esq.; Carter, DeLuca, Farrell & Schmidt, LLP (57) ABSTRACT

A protector with a sensor is installed on a sliding door for detecting an alien substance by touch between two core wires in a hollow part. In a terminal part of the protector with the sensor, the core wires drawn out are connected with a resistor or leads joined with a control unit. A primary seal is formed by injection molding for coating wire connection parts and another end side of an insert and a secondary seal is formed by the injection molding for coating a part formed with the primary seal for forming an external shape of a product.

19 Claims, 8 Drawing Sheets

(52) U.S. Cl.
CPC ............ E05F 15/0065 (2013.01); G01V 3/02 (2013.01); *E05F 15/44* (2015.01); *E05Y 2600/40* (2013.01); *E05Y 2900/531* (2013.01); *H01H 3/161* (2013.01); *H01H 13/183* (2013.01)

(56) References Cited

U.S. PATENT DOCUMENTS

| | | | |
|---|---|---|---|
| 6,339,305 B1* | 1/2002 | Ishihara | E05F 15/44 318/282 |
| 2002/0104373 A1* | 8/2002 | Ishihara | E05F 15/44 340/556 |
| 2004/0107640 A1* | 6/2004 | Ishihara | E05F 15/44 49/27 |
| 2012/0222296 A1* | 9/2012 | Miyamoto | E05F 15/443 29/825 |
| 2015/0267462 A1* | 9/2015 | Matsumoto | B29C 45/14065 73/862.541 |

OTHER PUBLICATIONS

English abstracts only.

* cited by examiner

AUTOMOTIVE OPENING SAFETY DEVICE HAVING A SENSOR

CROSS REFERENCE TO RELATED APPLICATION

This application claims the benefit under 35 USC §119 of JP Patent Applications JP 2013-166747 filed Aug. 9, 2013 and JP2014-101624 filed May 15, 2014, the entire disclosure of each of which is incorporated herein by reference.

BACKGROUND INFORMATION

The present invention relates to protectors with sensors and methods of molding end parts of the protectors with the sensors. When alien substances including fingers are caught between openings of automobiles and opening or closing objects for opening or closing the openings of automobiles, the sensors of the protectors output corresponding signals for detecting the alien substances. The opening or closing objects include: doors such as sliding doors on wagons, station wagons or the like sliding frontward and rearward of the automobile bodies and back doors; and sun roofs.

Figure 3:
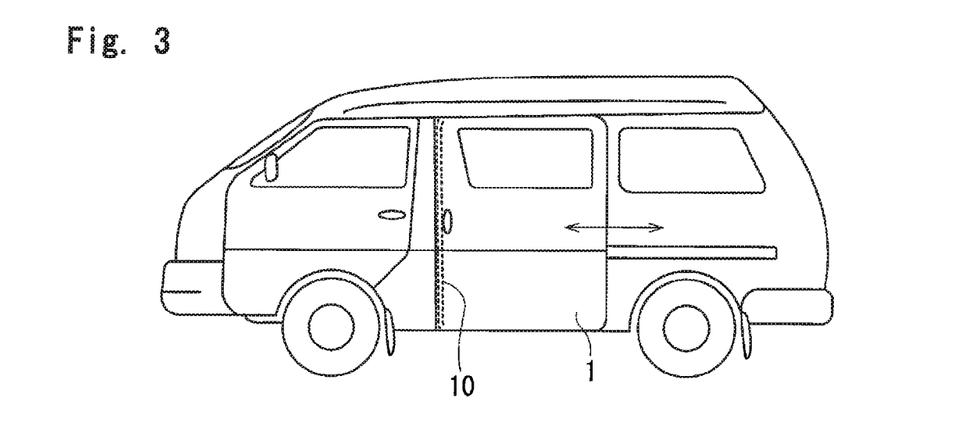
FIG. 3 is a side view of an automobile which opens or closes by a sliding door.
Figure 4:
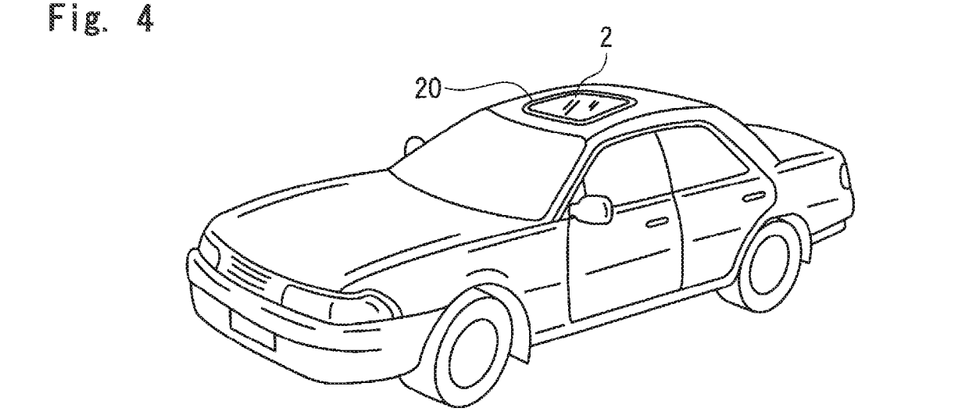
FIG. 4 is a perspective view of an automobile with a sun roof.

A protector 10, 20 with a sensor is installed on an automobile including a wagon shown in FIG. 3 of which a sliding door 1 (or a back door) opens or closes an opening of an automobile body or on an automobile shown in FIG. 4 of which sun roof 2 opens or closes the opening of the automobile body.

Figure 5:
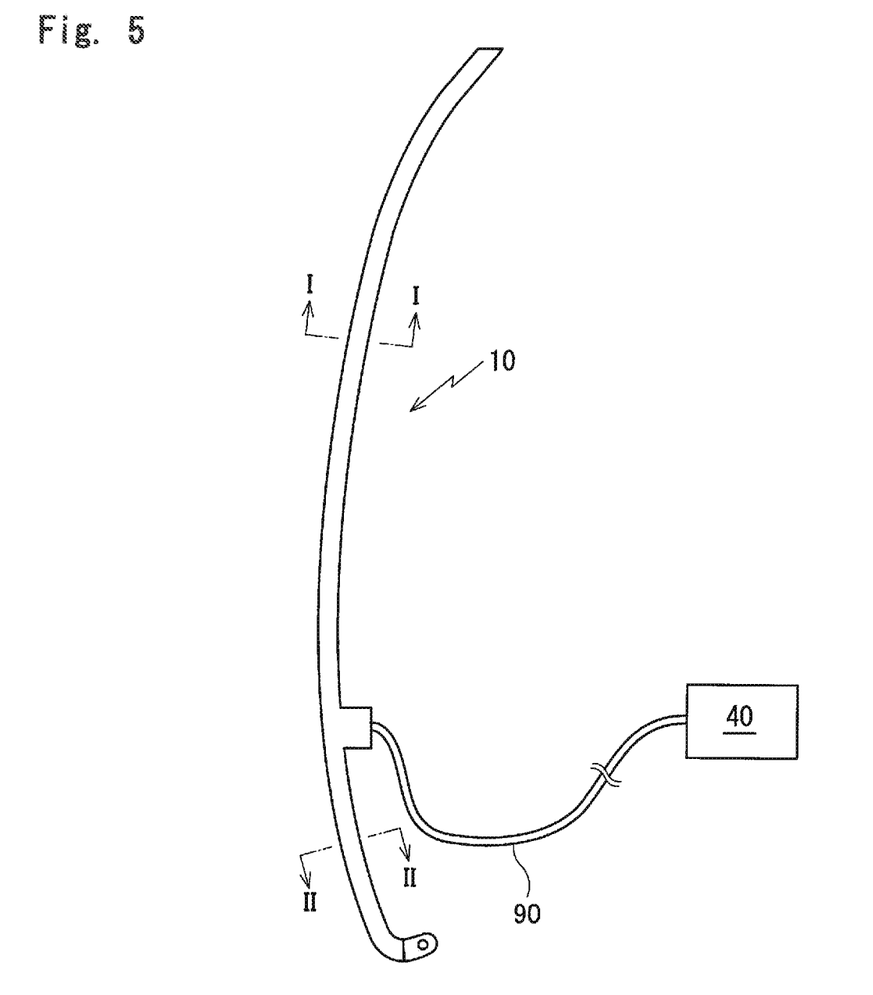
FIG. 5 is a side view of the protector with the sensor of FIG. 3.

For example, the protector 10 with the sensor, extending in an upper and lower direction as shown in FIG. 5, is installed on a front end surface of the sliding door 1. The protector 10 with the sensor extends frontward of the automobile body from the front end surface of the sliding door 1.

Figure 6:
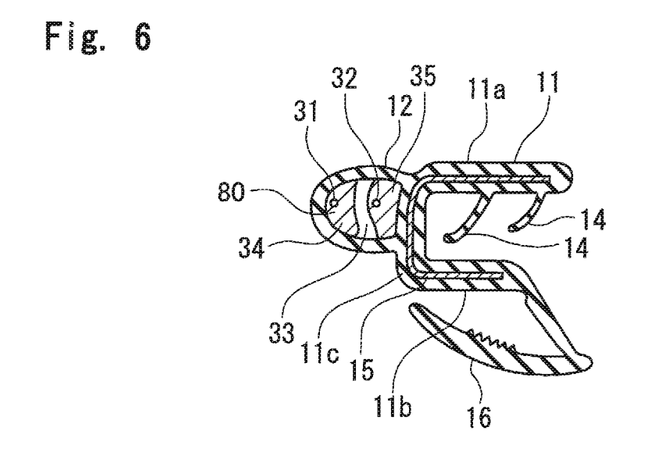
FIG. 6 is a I-I line enlarged cross section of FIG. 5.
Figure 7:
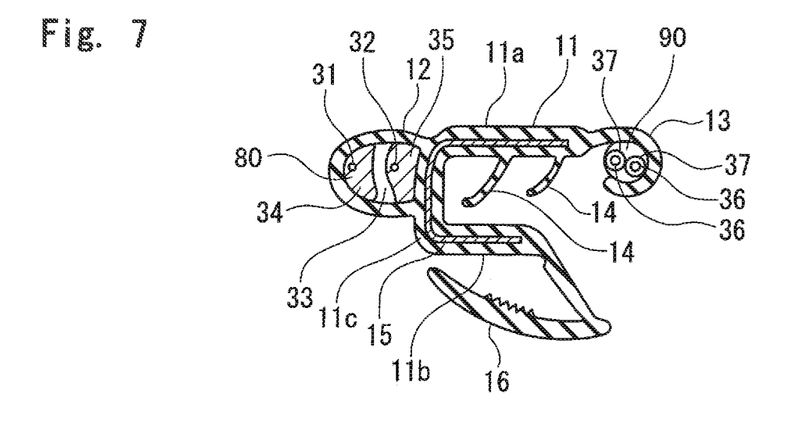
FIG. 7 is a II-II line enlarged cross section of FIG. 5.

As shown in FIG. 6 and FIG. 7, the protector 10 with the sensor, installed on the front end surface of the sliding door 1 comprises: an installation base member 11 having a substantially U-shaped cross section including an inner-cabin side wall 11a, an outer-cabin side wall 11b and a connecting wall 11c; and a hollow part 12 integrally molded with the installation base member 11. The hollow part 12 comprises a sensor (pressure sensitive sensor) 80 which outputs a corresponding electric signal upon detecting the alien substance such as a part of human bodies (fingers, hands or legs) between the sliding door 1 and a body side opening (may also be front door or side door) (see, for example, Japanese examined Patent Publications No.3700267 and No. 3844684.

In a lower part of the protector 10 with the sensor, a channel part 13 having a substantially C-shaped cross section is integrally molded with the inner-cabin side wall 11a side of the installation base member 11 for holding wire harness 90 joined with the pressure sensitive sensor 80. The installation base member 11 has a plurality of holding lips 14 formed inside and a core 15 having a substantially U-shaped cross section embedded therein for increasing rigidity. In addition, a decorative lip 16 is provided on the outer-cabin side wall 11b of the installation base member 11.

The sensor (pressure sensitive sensor) 80 has two core wires (electrode wires) 31, 32 extending in an upper and lower direction (longitudinal direction) embedded in conductive rubber like elastic bodies 34, 35 with a space 33 therebetween, which are fixed in the hollow part 12. As the alien substance is caught between the sliding door 1 and the body side opening while closing the sliding door 1, a part of the hollow part 12 is pressed and deformed, and then the rubber like elastic bodies 34, 35 contact with each other and the two core wires 31, 32 short. Resultant change in electric signal is transmitted to a control unit 40 joined with leads 36 which are connected with the two core wires 31, 32 in a lower side terminal part of the protector 10 with the sensor, and as a result, the alien substances are detected. The leads 36 covered with insulator are tied by the wire harness 90. Top ends of the leads 36, bared from covered parts 37, are naked wires.

Figures 8A, 8B, 8C:
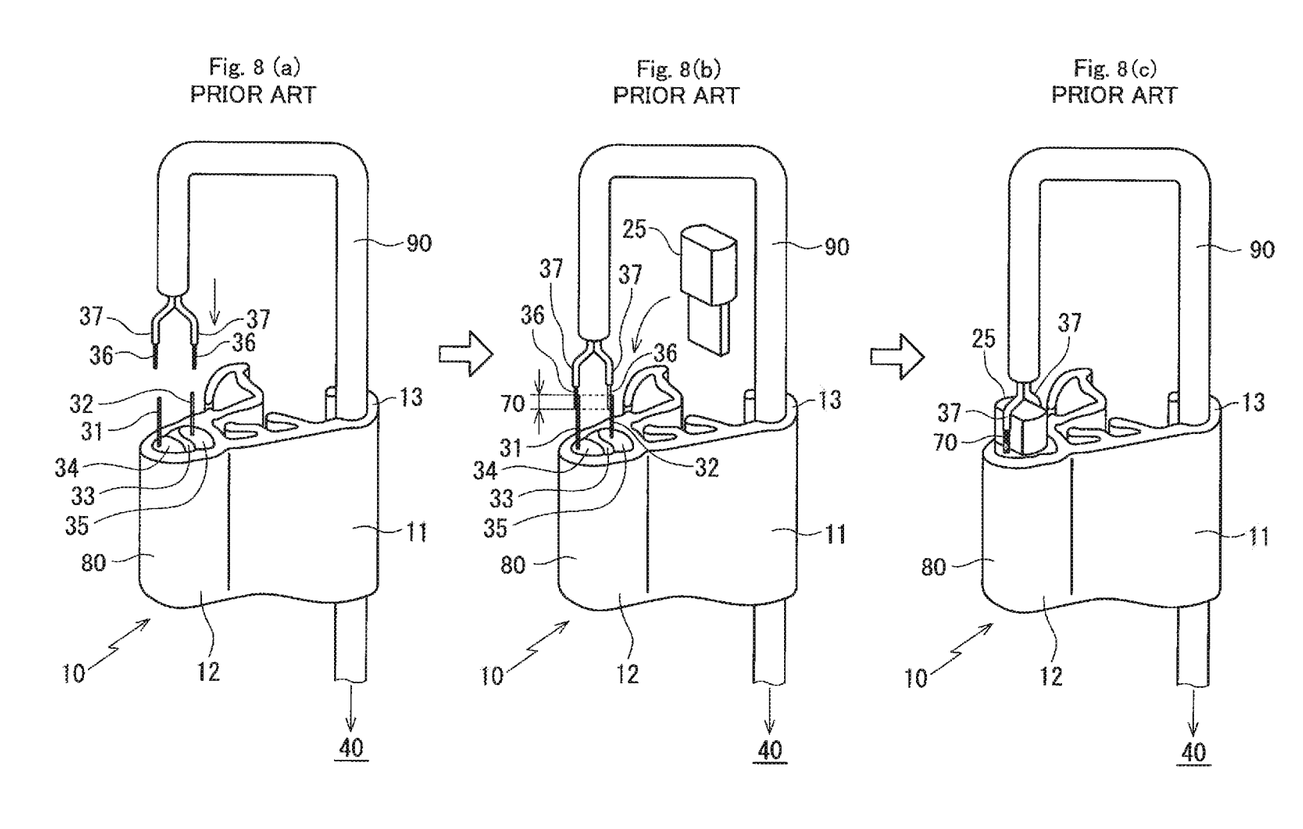

As shown in FIGS. 8(a) to 8(c), in the lower side terminal part of the protector 10 with the sensor, the leads 36 are piled on the two core wires 31, 32 drawn out in a longitudinal direction (left direction in FIGS. 8(a) to 8(c) relative to a sheet), the leads 36 and the two core wires 31, 32 are connected by resistance welding or soft soldering (FIG. 8(b)) and an insert 25 fills up the space 33 which is exposed in an end part (FIG. 8(c)). Then, as shown in FIG. 9, a wire connection part 70, the insert 25 and a part of the wire harness 90 are embedded in a die molded part by die molding and are not exposed.

Figure 10:
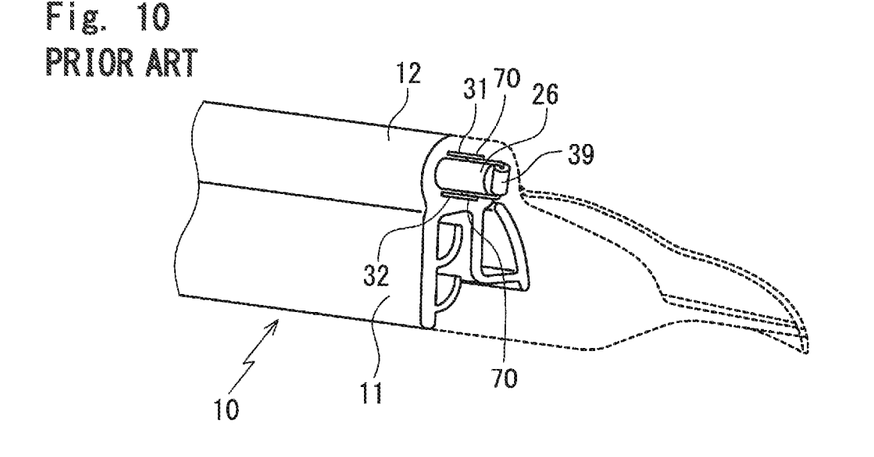
FIG. 10 is a perspective view of a structural gist of an upper side terminal part of the protector with the sensor according to the prior art after die molding.

Also, as shown in FIG. 10, in an upper side terminal part of the protector 10 with the sensor, legs of a resistor 39 are piled on the two core wires 31, 32 drawn out in the longitudinal direction (right direction in FIG. 10 relative to the sheet), the legs and the two core wires 31, 32 are connected by resistance welding or soft soldering and an insert 26 fills up the space 33. Then, the wire connection parts 70, the insert 26 and the resistor 39 are embedded in a die molded part by the die molding and are not exposed.

Figure 9:
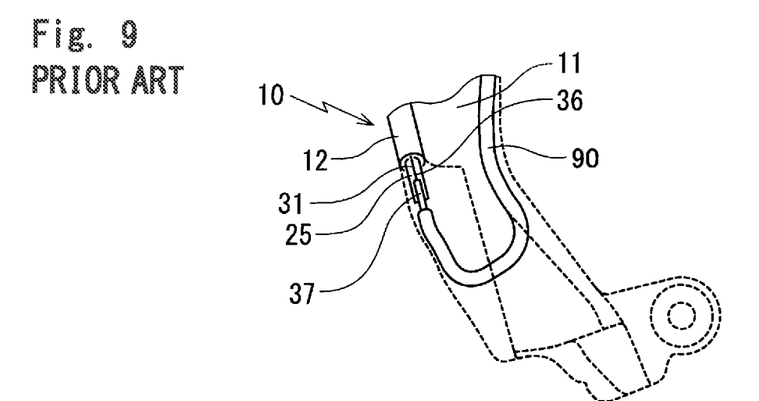
FIG. 9 is a perspective view of a structural gist of the lower side terminal part of the protector with the sensor according to the prior art after die molding.

In FIGS. 9 and 10, dotted lines show the die molded parts.

When water enters the wire connection parts 70, connected circuits may short, which causes improper operations. The wire connection parts 70 are between the two core wires 31, 32 and the leads 36 of the lower side terminal part of the protector 10 with the sensor or between the two core wires 31, 32 and the legs of the resistor 39 of the upper side terminal part of the protector 10 with the sensor. The wire connection parts 70 are connected by resistance welding or soft soldering.

In this connection, the wire connection parts 70 can be firmly fixed by sealing agent (adhesive) of epoxy resin disclosed in Japanese examined Patent Publication No.3700267. But the structure necessitates an extra process of adhesion and minutes or hours of time for curing the sealing agent. In addition, an increase in amount of adhesive to be used has caused insufficient adhesion. Further, use of adhesive tends to cause unevenness, which makes it difficult to stably fix the wire connection parts 70 or the resistor 39.

Especially, in case the wire connection parts 70 or the resistor 39 are not stably fixed, external shapes of resultant products become uneven while die molding the external shapes.

Alternatively, the wire connection parts 70 or the resistor 39 can be doubly coated by hot melt molding disclosed in Japanese examined Patent Publication No.3844684. But the structure necessitates extra members including supporting members for connecting hard-wirings, has a problem concerning heat-resistance and is degraded in mold releasability from the dies.

Therefore, an object of the present invention is to provide the protectors with sensors and the methods of molding the end parts of the protectors with the sensors, which are capable of decreasing unevenness in the shapes of the products while die molding the terminal parts and excellent in sealing function.

SUMMARY

In order to achieve the above-mentioned object, according to one aspect of the invention, a protector with a sensor is provided, the protector with the sensor comprising: an installation base member (11) operatively coupled on a peripheral edge of an opening or closing object for opening or closing an opening of an automobile body, the opening or closing object including a door (1) or a sun roof (2) of an automobile, or on a peripheral edge of said opening; and a hollow part (12) unified with the installation base member (11), the hollow part (12) having two core wires (31, 32) and a space (33) provided therein, the space (33) being positioned between the two core wires (31, 32); said installation base member (11) and said hollow part (12) forming an extrusion molded part made of a rubber like elastic body, in which:

when an alien substance, caught between said opening or closing object and said opening, presses and deforms said hollow part (12) while closing said opening or closing object, a corresponding change in electric signal detects said alien substance; and in a terminal part of said extrusion molded part, said core wires (31, 32) drawn out in a longitudinal direction are connected with leads (36), said leads (36) being joined with a control unit (40) or an electrical component, and one end side of an insert (25, 26) made of a non-conductive material is inserted in and fills up said space (33), and said terminal part of said extrusion molded part is die molded, wherein:

the terminal part of said extrusion molded part has a primary sealing layer (100) and a secondary sealing layer (200) formed thereon by injection molding respectively, said primary sealing layer (100) coating wire connection parts (70) of said core wires (31, 32) and said leads (36) joined with the control unit (40) or the electrical component, and another end side of said insert (25, 26), which are exposing from the terminal part, and said secondary sealing layer (200) being piled on and coating the primary sealing layer (100), and said secondary sealing layer (200) forming an external shape of a product.

It is to be noted that the "change in electric signal" includes a change by short between the two core wires and a change in capacitance.

In addition, according to an aspect of the present invention, die molding material of said primary sealing layer (100) is the rubber like elastic body which fuses the terminal part of said extrusion molded part during the injection molding of said primary sealing layer (100) and the die molding material of said secondary sealing layer (200) is the rubber like elastic body which fuses said primary sealing layer (100) during the injection molding of said secondary sealing layer (200).

In addition, according to an aspect of the present invention, the die molding material of said primary sealing layer (100) is one of or a blend among not less than two of: ethylene-propylene copolymer, ethylene propylene diene monomer (EPDM), or ethylene propylene rubber (EPM); or thermoplastic olefin (TPO) or thermoplastic styrene (TPS). Alternatively, the die molding material of said primary sealing layer (100) may be TPO or TPS which does not melt during the injection molding of the secondary sealing layer (200). In addition, according to an aspect of the present invention, said primary sealing layer (100) is colorless and transparent or colorless and semitransparent. It is to be noted that "which does not melt" means that the die molding material of the primary sealing layer does not plastically deform at a temperature of the injection molding.

The die molding material of the primary sealing layer (100) preferably is a blend of EPM and TPO, which comprises EPM not less than 30% or TPO not less than 30%.

In addition, according to an aspect of the present invention, said two core wires (31, 32) are embedded in conductive rubber like elastic bodies (34, 35) with said space (33) therebetween, which are fixed in said hollow part (12). Said two core wires (31, 32), said conductive rubber like elastic bodies (34, 35), said installation base member (11) and said hollow part (12) are extrusion molded simultaneously and integrally.

In addition, according to an aspect of the present invention, a method of molding an end part of a protector with a sensor is provided, the protector with the sensor comprising: an installation base member (11) operatively coupled on a peripheral edge of an opening or closing object for opening or closing an opening of an automobile body, the opening or closing object including a door (1) or a sun roof (2) of an automobile, or on a peripheral edge of said opening; and a hollow part (12) unified with the installation base member (11), the hollow part (12) having two core wires (31, 32) and a space (33) provided therein, the space (33) being positioned between the two core wires (31, 32); said installation base member (11) and said hollow part (12) being made of a rubber like elastic body which is extrusion molded, in which:

when an alien substance caught between said opening or closing object and said opening presses and deforms said hollow part (12) while closing said opening or closing object, a corresponding change in electric signal detects said alien substance; and in a terminal part of said extrusion molded part, said core wires (31, 32) drawn out in a longitudinal direction are connected with leads (36), said leads (36) being joined with a control unit (40) or an electrical component, and one end side of an insert (25, 26) made of a non-conductive material is inserted in and fills up said space (33), and said terminal part of said extrusion molded part is die molded, the method comprising:

forming a primary seal on the terminal part of said extrusion molded part by injection molding for coating wire connection parts (70) of said core wires (31, 32) and the leads (36) joined with the control unit (40) or the electrical component, and another end side of said insert (25, 26), which are exposing from the terminal part; and forming a secondary seal on a part formed with the primary seal by the injection molding for forming an external shape of a product.

Symbols in parentheses show constituents or items corresponding to the drawings.

According to the protector with the sensor of the present invention, the wire connection parts of the core wires and the leads joined with the control unit or the electrical component, which are exposing from the terminal part of the extrusion molded part of the protector with the sensor, are doubly sealed by the primary sealing layer and the secondary sealing layer. The structure improves certainty in sealing property in the terminal part.

In addition, the primary sealing layer and the secondary sealing layer are formed by the ordinary injection molding. Accordingly, as compared with a case using adhesive, the structure does not necessitate time for curing the sealing agent, which reduces time for operation and lowers cost. Also, the structure does not necessitate extra members including supporting members as in the prior art, which simplifies the operation. Further, since the structure enables to quantitatively inject the die molding material into the dies at a constant pressure, resultant products are hardly uneven, perform stable sealing function and are excellent in external appearance.

Especially, the primary sealing layer formed by the injection molding for directly coating the wire connection parts can stably hold the wire connection parts while forming the external shape of the product by the secondary sealing layer, so that the wire connection parts are hardly affected by injection molding pressure. In addition, the primary sealing layer formed by the injection molding is stable in the shape and each of the resultant products are uniform in the external shapes (size, shape and surface condition) of the primary sealing layers. Accordingly, conditions of injecting the secondary seal are stabilized, and unevenness in the external shapes of the resultant products which arises while molding the secondary seal is prevented, thereby improving productivity.

The structure prevents unevenness in flow (uneven flow) of the material of the secondary sealing layer during the injection molding, caused by unevenness in installing conditions or external shapes of the electric components in case the primary sealing layer is not formed, and unevenness in the resultant secondary sealing layer thus manufactured. The primary sealing layer which is simple in the external appearance and flat in the surface decreases resistance to the flow of the materials injected during the injection molding of the secondary seal, does not complicate the flow of the material, and prevents unevenness in the external shape of the secondary sealing layer. In addition, the structure that the electric components including the wire connection parts and the resistor are coated by the primary sealing layer certainly prevents exposure of the electric components on the external appearance of the product after the secondary sealing layer is molded.

In addition, the die molding material of the primary sealing layer is the rubber like elastic body which fuses the terminal part of the extrusion molded part during the injection molding of the primary sealing layer. The extrusion molded part is made of the rubber like elastic body and is extrusion molded. The die molding material of the secondary sealing layer is also the rubber like elastic body which fuses the primary sealing layer during the injection molding of the secondary sealing layer. The structure is improved in following-up property and the primary sealing layer and the secondary sealing layer do not easily come off even in case the primary sealing layer and the secondary sealing layer are subjected to stress.

The extrusion molded part with the conductive rubber like elastic body is made of the rubber like elastic body of which examples include: synthetic rubber such as EPDM; and thermoplastic elastomer such as TPO, TPS. Each of EPDM, EPM, TPO and the blend of TPO and EPM are excellent in adherence when used as the die molding material forming the primary sealing layer and firmly adhere to an end surface of the extrusion molded protector. Also, each of EPDM, EPM, TPO and the blend of TPO and EPM firmly adhere to the die molding material forming the secondary sealing layer.

Accordingly, even in case a part of the secondary sealing layer comes off, the primary sealing layer covers electric components including the wire connection parts and the resistor. This is because the primary sealing layer has high adhesion strength and is capable of keeping the shape without melting, even under heat and pressure during injection molding of the secondary sealing layer. The structure improves certainty in the sealing property of the end surface of the extrusion molded protector.

Effects of the blend of TPO and EPM vary depending on ratio between TPO and EPM. In case the blend comprises EPM not less than 30% at least, the resultant material has high adhesion strength and more firmly adheres to the end surface of the extrusion molded protector than TPO alone. In addition, as compared with the EPM alone, even under a high temperature, the blend of TPO and EPM is capable of keeping the shape for the effect of excellent molding property and heat resistance of TPO, which decreases defective molding. Also, as compared with the EPM alone, the blend of TPO and EPM is improved in the following-up property so that joining surfaces do not easily come off even in case the joining surfaces are subjected to the stress, and then, prevents entrance of water without fail and improves certainty. In case the blend of TPO and EPM comprises TPO not less than 30% at least, the resultant material is excellent in the heat resistance and is capable of keeping the shape, even in case the resultant material is subjected to a high temperature for a long time (at a temperature of 100° C. for 1000 hours, for example).

As mentioned above, the die molding material of the primary sealing layer preferably is the blend of TPO and EPM.

In addition, the sensor made of the conductive rubber like elastic bodies, having the two core wires embedded therein with the space therebetween, as well as the two core wires are extrusion molded simultaneously and integrally with the installation base member and the hollow part. Since the structure does not necessitate an extra process of installing the sensor, which is produced separately from the installation base member and the hollow part, on the installation base member by adhesive or inserting the sensor into the hollow part, the structure does not decrease productivity or increase cost.

In addition, the primary sealing layer of the present invention is colorless and transparent or colorless and semi-transparent. The structure enables to visually confirm the condition of the wire connection parts, which enables inspections of breakings of the wire connection parts, omissions in welding or the like, thereby improving certainty in quality.

BRIEF DESCRIPTION OF THE DRAWINGS

FIG. 8 (a), FIG. 8 (b) and FIG. 8 (c) are perspective views of processes before die molding a lower side terminal part of a protector with a sensor according to a prior art;

DESCRIPTION OF PREFERRED EMBODIMENT

Referring to the Drawings, a protector with a sensor according to an embodiment of the present invention will be described.

A protector 10 with a sensor of the embodiment of the present invention, which extends toward a front side of an automobile body is installed on a front end surface of a sliding door 1 of an automobile shown in FIG. 3 of which the sliding door 1 opens or closes an opening of the automobile body. A sensor (pressure sensitive sensor) 80 installed on the protector 10 with the sensor outputs corresponding electric signal upon detecting an alien substance such as a part of human body (finger, hand or leg) between the sliding door 1 and a body side opening (may also be front door or side door). Both the present invention and the prior art comprise the structures of FIG. 5 to FIG. 8. But the present invention is different from the prior art shown in FIG. 9 and FIG. 10 in structure of a terminal part of the protector 10 with the sensor after die molding and method of die molding the same. When constituents or items correspond to those in prior arts, the same symbols are used.

The protector 10 with the sensor comprises: an installation base member 11 operatively coupled on a flange (not shown) formed on a sliding door 1 directly; a hollow part 12 which is a tube body extending in an upper and lower direction in a longitudinal direction, integrally molded with the installation base member 11 and which makes elastic contact with the alien substance when the alien substance including a finger is caught between a front end surface of the sliding door 1 and a body side opening which faces the front end surface while closing the door 1; and the sensor (pressure sensitive sensor) 80 which is incorporated inside the hollow part 12 and which outputs a corresponding electric signal upon detecting the alien substance. The sensor (pressure sensitive sensor) 80 has two core wires (electrode wires) 31, 32 extending in an upper and lower direction (longitudinal direction) embedded in conductive rubber like elastic bodies 34, 35 with a space 33 therebetween, which are fixed in the hollow part 12. The conductive rubber like elastic bodies 34, 35 are made of synthetic rubber including EPDM. The sensor 80 is extrusion molded simultaneously and integrally with the installation base member 11 and the hollow part 12.

Figure 1:
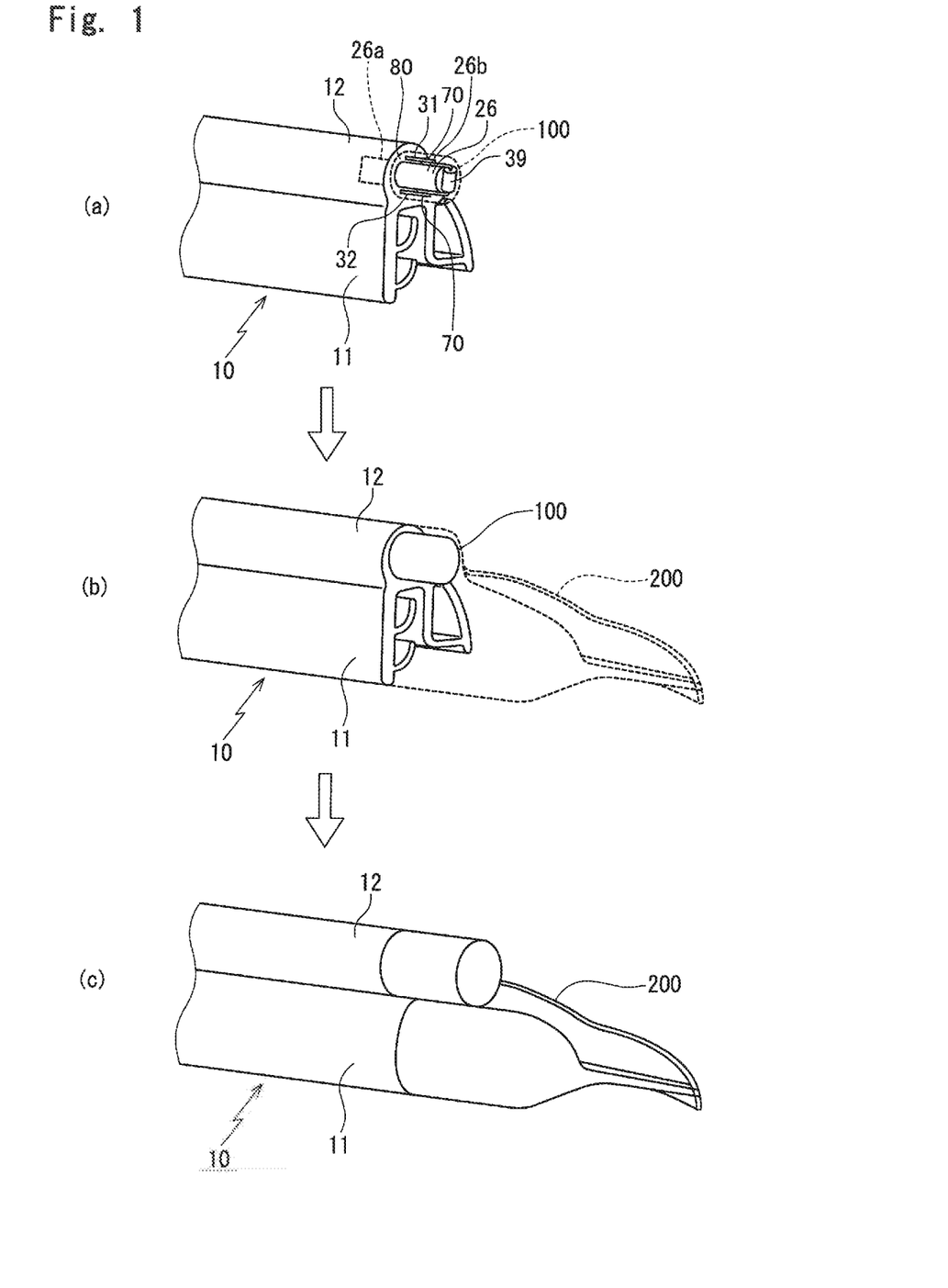
FIG. 1(a), FIG. 1(b) and FIG. 1(c) are perspective views of an upper side terminal part of a protector with a sensor according to an embodiment of the present invention at a time of die molding.

As shown in FIG. 1, in an upper side terminal part of the protector 10 with the sensor, an insert 26 fills up the space 33 of the hollow part 12 which is open in the upper side terminal part.

The installation base member 11, the hollow part 12 and the conductive rubber like elastic bodies 34, 35 of the protector 10 with the sensor form an extrusion molded part made of a rubber like elastic body including: synthetic rubber such as EPDM; and thermoplastic elastomer such as TPO, TPS. The upper and lower side terminal parts of the protector 10 with the sensor are die molded for arranging an external shape thereof.

The insert 26 is made of polypropylene, polyethylene, polyethylene terephthalate, nylon, 6 nylon, 6-6 nylon or thermoplastic elastomer (TPE). Examples of the material of the insert 26 also include flexible and non-conductive material such as olefin TPO or stylene TPS of TPE. The insert 26 comprises an insertion part 26a on one end side and a protrusion part 26b on another end side.

The insertion part 26a has a cross sectional shape which is substantially the same as or a little larger than the space 33 for being inserted in the space 33 of the hollow part 12 and tightly filling up the space 33, thereby preventing decline in sensor function caused by die molding material flowing in the space 33 during die molding.

A body of a resistor 39 (electric appliance) is stably positioned on an end of the protrusion part 26b, legs of the resistor 39 are piled on the two core wires 31, 32 drawn out toward an upside in the longitudinal direction (right direction in FIG. 1 (a) relative to a sheet), and the legs and the two core wires 31, 32 are connected by resistance welding or soft soldering.

The insertion part 26a of the insert 26 fills up the space 33 and then, the protrusion part 26b of the insert 26, the wire connection parts 70, the body and the legs of the resistor 39 are embedded in a die molded part by die molding an upper end of the protector 10 and are not exposed.

The upper end of the protector 10, which is extrusion molded, has a primary sealing layer 100 and a secondary sealing layer 200 formed thereon by injection molding respectively. The primary sealing layer 100 coats wire connection parts 70 of the core wires 31, 32 and legs of the resistor 39, the body of the resistor 39, and the protrusion part 26b of the insert 26, which are exposing from the terminal part, from an outside. The secondary sealing layer 200 is piled on and coats the primary sealing layer 100. The secondary sealing layer 200 forms an external shape of a product.

As shown in FIG. 1(a), a method of molding the upper end of the protector 10 with the sensor comprises: arranging the terminal part of the protector 10, of which the core wires 31, 32 and the resistor 39 are connected, in a primary die not shown; and forming the primary sealing layer 100 for coating the wire connection parts 70, the resistor 39 and the protrusion part 26b of the insert 26 from the outside by the ordinary injection molding.

The die molding material of the primary sealing layer 100 fuses the upper end of the protector 10 with the sensor during the injection molding of the primary sealing layer 100.

The die molding material of the primary sealing layer 100 may be any kind of resin composite containing olefin thermoplastic resin. Examples of the die molding material of the primary sealing layer 100 include: the thermoplastic resin containing at least one of polyethylene and polypropylene; polyethylene; and polypropylene. The examples also include: copolymer of polyethylene and polypropylene (ethylene-propylene copolymer), having rubber like elasticity. Examples of the copolymer include: Hifax (registered trademark); Adflex (registered trademark); Softell (registered trademark); P.E.R. (Tokuyama Corporation); Vistamaxx (registered trademark); which are known as a reactor type.

The examples of the die molding material of the primary sealing layer 100 further include: EPDM (ethylene-propylene-diene terpolymer) and EPM (ethylene-propylene copolymer).

The examples of the die molding material of the primary sealing layer 100 further include: TPO (olefin thermoplastic elastomer); and TPS (styrene thermoplastic elastomer) containing olefin resin; which are excellent in heat resistance and pressure resistance so that the primary sealing layer 100 does not melt during the injection molding of the secondary sealing layer 200.

The die molding material of the primary sealing layer 100 may also be a blend of not less than two of the above-mentioned thermo plastic resin composite.

The resin composite which is colorless and transparent or colorless and semitransparent enables to visually confirm the condition of the wire connection parts 70. The resin composite preferably is flexible and has rubber elasticity. Examples of the olefin thermoplastic elastomer include: Santoprene (Exxon Mobile Corporation); Milastomer (Mitsui Chemicals, Inc.); Thermorun (Mitsubishi Chemical Corporation); and EXCELINK (JSR Corporation).

The extrusion molded part with the conductive rubber like elastic body is made of the rubber like elastic body of which examples include: synthetic rubber such as EPDM; and thermoplastic elastomer such as TPO, TPS. Each of EPDM, EPM, TPO and the blend of TPO and EPM are excellent in adherence when used as the die molding material forming the primary sealing layer 100 and firmly adhere to the end surface of the extrusion molded protector 10. Also, each of EPDM, EPM, TPO and the blend of TPO and EPM firmly adhere to the die molding material forming the secondary sealing layer 200.

According to comparison among EPDM, EPM, TPO and the blend of TPO and EPM, use of TPO enables firm adhesion on the end surface of the extrusion molded protector 10 but is inferior to EPM in the adhesion. Some of EPM are not capable of keeping shapes when subjected to a high temperature (not less than 80° C.) for a long time (at a temperature of 100° C. for 1000 hours, for example).

Figure 11:
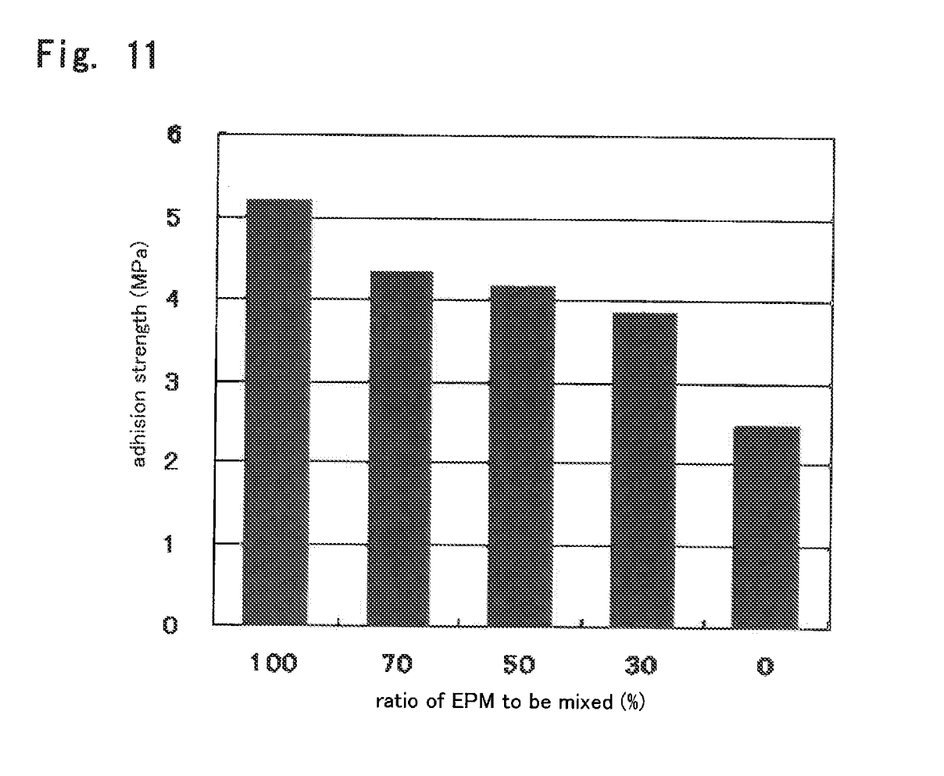
FIG. 11 is a graph showing a relation between adhesion strength and ratio of EPM mixed in blended material of TPO and EPM.

Effects of the blend of TPO and EPM vary depending on ratio between TPO and EPM. In case the blend comprises EPM not less than 30% at least, the resultant material is excellent in adhesion strength (MPa) as shown in FIG. 11 and more firmly adheres to the end surface of the extrusion molded protector 10 than TPO alone. A method of measuring the adhesion strength shown in FIG. 11 comprises: molding a plate-like EPDM sponge rubber by extrusion and vulcanization; forming consecutive rectangles having thickness of 2 mm by injection molding the blend of TPO and EPM on the cut surfaces (surfaces cut out in a right angle direction relative to direction of extrusion) of the plate-like EPDM sponge rubber; forming test pieces into dumbbell shapes (dumbbell shape no. 2 prescribed by JIS K 6251 of Japanese Industrial Standards (JIS)), of which borders come to centers; and pulling the test pieces at a speed of 200 mm/min for testing load at which both sides separate from each other. The injection molding materials used in the embodiment are EXCELINK (JSR Corporation) as TPO and Vistamaxx (Exxon Mobil Corporation) as EPM, which are dry-blended by certain amount.

In addition, as compared with the EPM alone, the blend of TPO and EPM is capable of keeping the shape even under the high temperature for the effect of excellent molding property and heat resistance of TPO, which decreases defective molding. Also, as compared with the EPM alone, the blend of TPO, having higher flexibility than EPM, with EPM is improved in the following-up property so that joining surfaces do not easily come off even in case the joining surfaces are subjected to the stress, prevents entrance of water without fail and improves the certainty. In case the blend of TPO and EPM comprises TPO not less than 30% at least, the resultant material is excellent in heat resistance and is capable of keeping the shape even in case the resultant material is subjected to the high temperature for a long time (at the temperature of 100° C. for 1000 hours, for example).

The blend of TPO and EPM is most suitable for the die molding material of the primary sealing layer 100. In addition, the blend of TPO and EPM, which comprises EPM not less than 30% at least or TPO not less than 30% at least, is more preferable.

Then, as shown in FIG. 1 (b), the terminal part of the protector 10 with the sensor, having the primary sealing layer 100 formed thereon, is set in a secondary die not shown for forming a secondary seal by the ordinary injection molding in a manner that the secondary sealing layer 200 coats a part formed with a primary seal from an outside. As a result, as shown in FIG. 1 (c), the secondary sealing layer 200 forms an external shape of an upper end of the protector 10 with the sensor as a product.

The die molding material of the secondary sealing layer 200 fuses the primary sealing layer 100 during the injection molding of the secondary sealing layer 200. The die molding material of the secondary sealing layer 200 is made of the rubber like elastic body including: EPDM (ethylene-propylene-diene terpolymer); EPM (ethylene-propylene copolymer); TPO (olefin thermoplastic elastomer); and TPS (styrene thermoplastic elastomer).

The primary sealing layer 100 and the secondary sealing layer 200 may be die molded in a manner to touch only a section of the terminal of the upper end of the protector 10 with the sensor or in a manner to be piled on a periphery of the terminal in addition to the section of the terminal.

According to the protector 10 with the sensor, the wire connection parts 70 of the core wires 31, 32 and the legs of the resistor 39, which is exposing from the terminal part of the extrusion molded part, are doubly sealed by the primary sealing layer 100 and the secondary sealing layer 200. The structure improves certainty in sealing property in the terminal part.

In addition, the primary sealing layer 100 and the secondary sealing layer 200 are formed by the ordinary injection molding. Accordingly, as compared with a case using adhesive, the primary sealing layer 100 and the secondary sealing layer 200 do not necessitate time for curing the adhesive, which reduces time for operation and lowers cost. Further, since the structure enables to quantitatively inject the die molding material into the dies at stable pressure, resultant products are hardly uneven and perform stable sealing function.

Especially, the primary sealing layer 100 formed by the injection molding for directly coating the wire connection parts 70 can stably hold the wire connection parts 70 while forming the secondary sealing layer 200 as the external shape of the product, so that the wire connection parts 70 are hardly affected by injection molding pressure. In addition, since the primary sealing layer 100 is formed by the injection molding, the external shapes of the primary sealing layer 100 of each of the products are uniform. Accordingly, unevenness in the external shapes of the resultant products, which arises while molding the secondary seal, is prevented.

In addition, the die molding material of the primary sealing layer 100 is the rubber like elastic body which fuses the terminal part of the extrusion molded part of the protector 10 during the injection molding of the primary sealing layer 100. The extrusion molded part of the protector 10 is made of the rubber like elastic body and extrusion molded. The die molding material of the secondary sealing layer 200 is also the rubber like elastic body which fuses the primary sealing layer 100 during the injection molding of the secondary sealing layer 200. The structure is excellent in the following-up property, and the primary sealing layer 100 and the secondary sealing layer 200 do not easily come off even in case the primary sealing layer 100 and the secondary sealing layer 200 are subjected to stress. The structure prevents entrance of water. In addition, in case the insert 26 is made of material which welds to the primary sealing layer 100, the insert 26, the primary sealing layer 100 and the secondary sealing layer 200 unify, thereby forming a structure which hardly allows the entrance of water.

In addition, the sensor 80 comprising the conductive rubber like elastic bodies 34, 35, having the two core wires 31, 32 embedded therein with the space 33 therebetween as well as the two core wires 31, 32 is extrusion molded simultaneously and integrally with the installation base member 11 and the hollow part 12. Since the structure does not necessitate a process of installing the sensor 80, which is produced separately from the installation base member 11 and the hollow part 12, on the installation base member 11 by adhesive or inserting the sensor 80 into the hollow part 12, the structure does not decrease productivity or increase cost.

Figure 2:
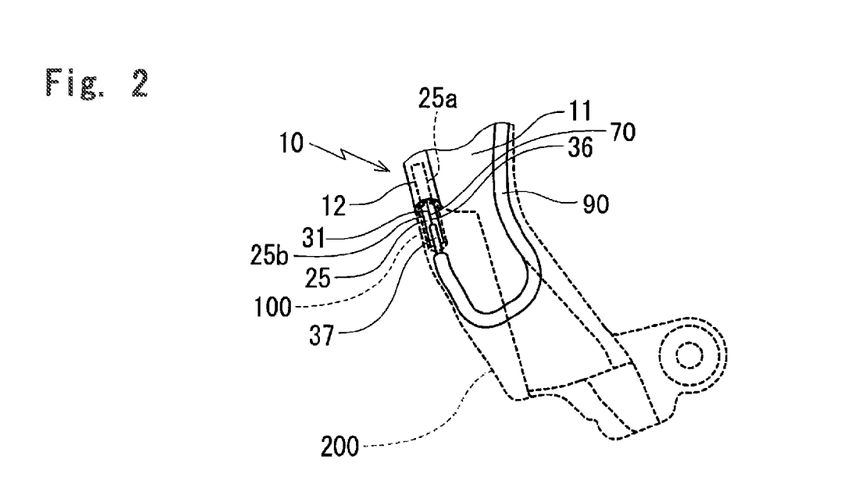
FIG. 2 is a perspective view of a lower side terminal part of a protector with a sensor according to an embodiment of the present invention at a time of die molding.

While the present embodiment specifies a method of die molding the upper side terminal part of the protector 10 with the sensor, the present embodiment is also applicable to a method of die molding a lower side terminal part of the protector 10 with the sensor shown in FIG. 2 in which the leads 36 are piled on the two core wires 31, 32 (the core wire 32 positioned on a back of the core wire 31 does not appear on FIG. 2), and the leads 36 and the two core wires 31, 32 are connected by resistance welding or soft soldering. Specifically, in the lower end of the protector 10 which is extrusion molded, the primary sealing layer 100 formed by the injection molding coats the wire connection parts 70 of the core wires 31, 32 and the leads 36, and the protrusion part 25b of the insert 25, which are exposing from the terminal part, from the outside. The secondary sealing layer 200 is piled on and coats the primary sealing layer 100. The secondary sealing layer 200 forms the external shape of the product.

While the present embodiment specifies an example that the installation base member 11, the hollow part 12 and the sensor 80 are integrally molded, the installation base member 11, the hollow part 12 and the sensor 80 may be separately molded so that the installation base member 11 and the hollow part 12 are fixed by adhesive or adhesive tape, and the sensor 80 is inserted in the hollow part 12 for unification. Alternatively, any two of the installation base member 11, the hollow part 12 and the sensor 80 may be integrally molded and a remaining member is separately molded.

In the present embodiment, the installation base member 11 has a plurality of holding lips 14 formed inside and a core 15 having a substantially U-shaped cross section embedded therein. But the installation base member 11 may have only one holding lip 14, 14 or may be without the core 15 embedded therein. Also, any installation base member 11 having a part thereof for fixing the hollow part 12 and the sensor 80 thereon is usable. Methods of fixing the hollow part 12 and the sensor 80 on the sliding door 1 vary, including use of adhesive tape as well as gripping and fitting the hollow part 12 and the sensor 80.

The present embodiment specifies an example that the protector 10 with the sensor is installed on the sliding door 1 side of the automobile, which slides frontward and rearward. But the protector 10 with the sensor may be installed on the body side opening for detecting the alien substance between the sliding door and the body side opening.

Also, the protector 10 with the sensor is applicable to a back door or a sun roof 2 (FIG. 4).

We claim:

1. A protector with a sensor comprising: an installation base member operatively coupled on a peripheral edge of an opening or closing object for opening or closing an opening of an automobile body, the opening or closing object including a door or a sun roof of an automobile, or on a peripheral edge of said opening; and a hollow part unified with the installation base member, the hollow part having a pressure sensor comprising two core wires and a space provided therein, the space being positioned between the two core wires; said installation base member and said hollow part forming an extrusion molded part made of a rubber like elastic body which is extrusion molded, in which:
   when an alien substance, caught between said opening or closing object and said opening, presses and deforms said hollow part while closing said opening or closing object, an electric signal is generated by the pressure sensor which signifies detection of said alien substance; and
   in a terminal part of said extrusion molded part, said core wires which are drawn out in a longitudinal direction are connected with leads, said leads being joined with a control unit or an electrical component, and one end side of an insert made of a non-conductive material is inserted in and fills up said space, and said terminal part of said extrusion molded part is die molded, wherein:
   the terminal part of said extrusion molded part has a primary sealing layer and a secondary sealing layer formed thereon by injection molding respectively, said primary sealing layer coating wire connection parts of said core wires of the terminal part and said leads joined with the control unit or the electrical component and another end side of said insert, which are exposed within the terminal part, and said secondary sealing layer being piled on and coating the primary sealing layer, and said secondary sealing layer and forming an external shape of a product.

2. The protector with the sensor as claimed in claim 1, wherein: die molding material of said primary sealing layer is the rubber like elastic body which fuses the terminal part of said extrusion molded part during the injection molding of said primary sealing layer and the die molding material of said secondary sealing layer is the rubber like elastic body which fuses said primary sealing layer during the injection molding of said secondary sealing layer.

3. The protector with the sensor as claimed in claim 1, wherein: the die molding material of said primary sealing layer is one of or a blend among not less than two of: ethylene-propylene copolymer, ethylene propylene diene monomer (EPDM), or ethylene propylene rubber (EPM); or thermoplastic olefin(TPO) or thermoplastic styrene (TPS).

4. The protector with the sensor as claimed in claim 1, wherein: the die molding material of said primary sealing layer is thermoplastic olefin (TPO) or thermoplastic styrene (TPS) which does not melt during the injection molding of the secondary sealing layer.

5. The protector with the sensor as claimed in claim 1, wherein: the die molding material of the primary sealing layer is a blend of ethylene propylene rubber (EPM) and thermoplastic olefin (TPO), the blend comprising EPM not less than 30%.

6. The protector with the sensor as claimed in claim 1, wherein: the die molding material of the primary sealing layer is a blend of ethylene propylene rubber (EPM) and thermoplastic olefin (TPO), the blend comprising TPO not less than 30%.

7. The protector with the sensor as claimed in claim 1, wherein: said primary sealing layer is colorless and transparent or colorless and semitransparent.

8. The protector with the sensor as claimed in claim 2, wherein: the die molding material of said primary sealing layer is one of or a blend among not less than two of:

ethylene-propylene copolymer, ethylene propylene diene monomer (EPDM), or ethylene propylene rubber (EPM); or thermoplastic olefin (TPO) or thermoplastic styrene (TPS).

9. The protector with the sensor as claimed in claim 2, wherein: the die molding material of said primary sealing layer is thermoplastic olefin (TPO) or thermoplastic styrene (TPS) which does not melt during the injection molding of the secondary sealing layer.

10. The protector with the sensor as claimed in claim 2, wherein: the die molding material of the primary sealing layer is a blend of EPM and thermoplastic olefin (TPO), the blend comprising ethylene propylene rubber (EPM) not less than 30%.

11. The protector with the sensor as claimed in claim 2, wherein: the die molding material of the primary sealing layer is a blend of ethylene propylene rubber (EPM) and thermoplastic olefin (TPO), the blend comprising TPO not less than 30%.

12. The protector with the sensor as claimed in claim 2, wherein: said primary sealing layer is colorless and transparent or colorless and semitransparent.

13. The protector with the sensor as claimed in claim 3, wherein: said primary sealing layer is colorless and transparent or colorless and semitransparent.

14. The protector with the sensor as claimed in claim 8, wherein: said primary sealing layer is colorless and transparent or colorless and semitransparent.

15. The protector with the sensor as claimed in claim 4, wherein: said primary sealing layer is colorless and transparent or colorless and semitransparent.

16. The protector with the sensor as claimed in claim 5, wherein: said primary sealing layer is colorless and transparent or colorless and semitransparent.

17. The protector with the sensor as claimed in claim 10, wherein: said primary sealing layer is colorless and transparent or colorless and semitransparent.

18. The protector with the sensor as claimed in claim 6, wherein: said primary sealing layer is colorless and transparent or colorless and semitransparent.

19. The protector with the sensor as claimed in claim 11, wherein: said primary sealing layer is colorless and transparent or colorless and semitransparent.

\* \* \* \* \*